US010827065B2

(12) United States Patent
Tichauer et al.

(10) Patent No.: US 10,827,065 B2
(45) Date of Patent: *Nov. 3, 2020

(54) SYSTEMS AND METHODS FOR PROVIDING INTEGRATED COMPUTERIZED PERSONAL ASSISTANT SERVICES IN TELEPHONY COMMUNICATIONS

(71) Applicant: VONAGE BUSINESS INC., Atlanta, GA (US)

(72) Inventors: Royee Uriel Tichauer, Haifa (IL); Iliya Barenboim, Ramat Gan (IL); Lihi Gendelis, Tel Aviv-Jaffa (IL); Tzachi Azo, Jerusalem (IL); Natan Shaltiel, Tel-Aviv (IL); Sagi Dudai, Tel-Aviv (IL)

(73) Assignee: Vonage Business Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,489

(22) Filed: Jan. 17, 2020

(65) Prior Publication Data

US 2020/0153963 A1 May 14, 2020

Related U.S. Application Data

(63) Continuation of application No. 15/245,637, filed on Aug. 24, 2016, now Pat. No. 10,567,579.

(51) Int. Cl.
*H04M 3/493* (2006.01)
*H04M 3/527* (2006.01)

(52) U.S. Cl.
CPC .......... *H04M 3/4936* (2013.01); *H04M 3/527* (2013.01); *H04M 2201/40* (2013.01); *H04M 2203/2072* (2013.01)

(58) Field of Classification Search
CPC .............. H04M 3/4936; H04M 3/527; H04M 2201/40; H04M 2203/2072; H04M 7/006;
(Continued)

(56) References Cited

U.S. PATENT DOCUMENTS 6,785,741 B1 * 8/2004 Mandalia ............ H04M 3/5191
379/70
8,107,401 B2 1/2012 John et al.
(Continued)

OTHER PUBLICATIONS

Belshe et al., "Hypertext Transfer Protocol Version 2 (HTTP/2); Internet Engineering Task Force (IETF); Request for comments (RFC) Paper No. 7540; 97 pp.", May 2015.

*Primary Examiner* — Akelaw Teshale
(74) *Attorney, Agent, or Firm* — Moser Taboada; Joseph Pagnotta

(57) ABSTRACT

Systems and methods for providing integrated computerized personal assistant services in telephony communications are provided herein. In some embodiments, the method comprises transmitting, by a call processing system, (A) voice-based data generated during the telecommunication session and (B) identification information of at least one of the first or second participants to a computerized virtual assistant system, wherein the voice-based data generated during the telecommunication session includes an actionable command; and receiving, from the computerized virtual assistant system, a response from at least one service provider regarding a performance of the actionable command.

18 Claims, 5 Drawing Sheets

(58) Field of Classification Search
CPC .......... H04M 3/2281; H04M 3/42059; H04M 3/42102; H04M 3/5166; H04M 3/5175; H04M 3/5183; H04M 1/05; H04M 1/6066; H04M 1/7253
See application file for complete search history.

(56) References Cited

U.S. PATENT DOCUMENTS

| | | | | |
|---|---|---|---|---|
| 10,403,272 B1* | 9/2019 | Fanty | ............... | G10L 15/22 |
| 2001/0028654 A1* | 10/2001 | Anjum | ............... | H04Q 3/0054 |
| | | | | 370/401 |
| 2012/0310870 A1* | 12/2012 | Caves | ............... | G06F 11/3688 |
| | | | | 706/14 |
| 2013/0152092 A1* | 6/2013 | Yadgar | ............... | G10L 15/22 |
| | | | | 718/102 |
| 2013/0275138 A1 | 10/2013 | Gruber et al. | | |
| 2013/0275164 A1* | 10/2013 | Gruber | ............... | G06Q 10/02 |
| | | | | 705/5 |
| 2014/0164400 A1* | 6/2014 | Kruglick | ............... | G06F 16/9566 |
| | | | | 707/749 |
| 2015/0088514 A1* | 3/2015 | Typrin | ............... | G06F 3/167 |
| | | | | 704/249 |
| 2015/0160956 A1* | 6/2015 | Shah | ............... | H04L 63/08 |
| | | | | 718/1 |
| 2015/0169284 A1* | 6/2015 | Quast | ............... | G06F 16/9535 |
| | | | | 704/275 |
| 2015/0169336 A1* | 6/2015 | Harper | ............... | G10L 15/22 |
| | | | | 715/706 |
| 2015/0172262 A1* | 6/2015 | Ortiz, Jr. | ............... | H04W 12/04 |
| | | | | 726/4 |
| 2015/0358228 A1* | 12/2015 | Burgio | ............... | H04L 45/22 |
| | | | | 370/392 |
| 2015/0373183 A1 | 12/2015 | Woolsey et al. | | |
| 2016/0070581 A1* | 3/2016 | Soon-Shiong | ............... | G06Q 50/10 |
| | | | | 715/706 |

* cited by examiner

SYSTEMS AND METHODS FOR PROVIDING INTEGRATED COMPUTERIZED PERSONAL ASSISTANT SERVICES IN TELEPHONY COMMUNICATIONS

CROSS-REFERENCE TO RELATED APPLICATIONS

This application is a continuation of co-pending U.S. patent application Ser. No. 15/245,637 filed Aug. 24, 2016, which is incorporated herein by reference in its entirety.

BACKGROUND OF THE INVENTION

Field of the Invention

Embodiments of the present invention relate generally to communication systems and, more particularly, to methods and systems for providing and using integrated automated/computerized personal assistance systems in voice telephony systems and communications.

Description of the Related Art

Voice recognition technology has made significant breakthroughs in recent years. Computerized voice assistants, such as AMAZON's ALEXA, APPLE's SIRI, GOOGLE's GOOGLE NOW, MICROSOFT's CORTANA provide users with the ability to interact with many different online services, built-in services on the end user device, and/or other connected devices in a more intuitive way using voice commands. These computerized voice assistants are typically built-into the end user device itself, such as smartphones, tablets, computers, speakers, etc.

However, it is difficult to interact with existing computerized voice assistants while being on a voice call at the same time. Existing systems do not stream audio responses from a computerized voice assistant to all parties on the call at the same time. Furthermore, the built-in computerized voice assistants installed on each end user device are not capable of integrating services/functions associated with other parties on the voice call. That is, they are configured to assist only the user whose device the assistant is installed on without taking into account input from the other parties.

Accordingly, there exists a need in the art for methods and systems for providing and using integrated automated/computerized personal assistance systems in voice telephony communications including multiple participants on a call.

SUMMARY OF THE INVENTION

Systems and methods for providing integrated computerized personal assistant services in telephony communications are provided herein. In some embodiments, the system may include a call processing system configured to transmit voice-based data generated during a telecommunication session between multiple participants, and a computerized virtual assistant system configured to analyze the voice-based data received to identify the presence of actionable commands, determine at least one service provider associated with the identified actionable command, generate and transmit at least one request for performance of the actionable command to the at least one service provider, receive, from each of the at least one service providers, a response to the at least one request for performance of the actionable command, and transmit, to the call processing system, a notification based on the responses received from the at least one service provider.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
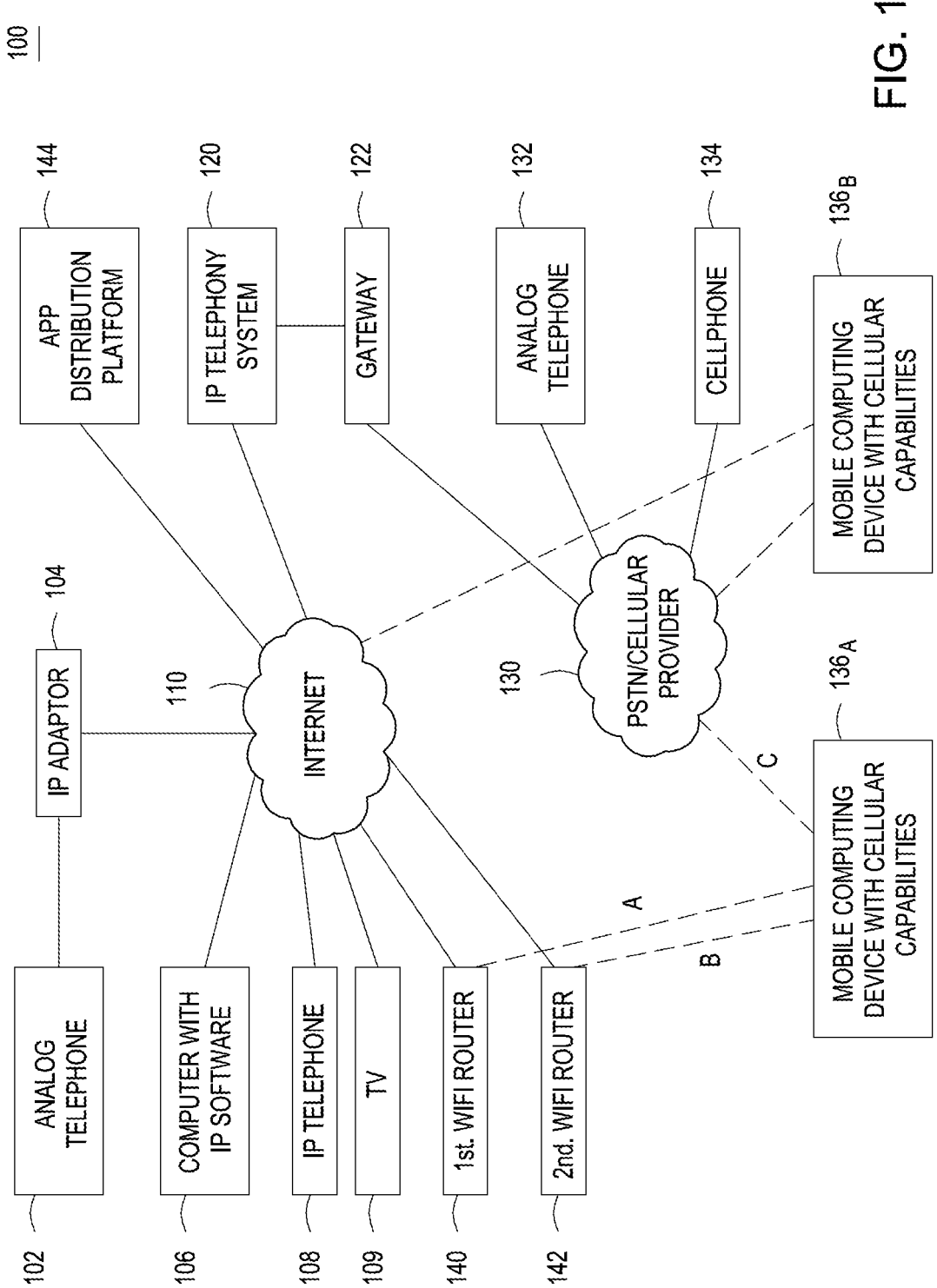
FIG. 1 is a diagram of a communication system in accordance with one or more exemplary embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the present invention are directed to methods and systems for providing and using integrated automated/computerized personal assistance systems in voice telephony systems and communications. Specifically, the integration between telephony provider call processing systems, automated/computerized personal assistance systems, and third party services, and specifically about how information is passed between these systems/services in the context of a voice call, is described herein. Thus, users can advantageously use the services provided by an automated personal assistance during, and as part of, voice calls and not have to disengage with the call in order to interact with the automated personal assistance.

Embodiments consistent with the present invention leverage of the voice recognition and automatic assistance type technology (I.e. AMAZON's ALEXA, APPLE's SIRI, GOOGLE's GOOGLE NOW, MICROSOFT's CORTANA, etc.) and add in call functionality which will allow the participants of the call to be able to ask for information or request commands through a computerized system which will act as a participant on the call. The automated/computerized personal assistance system will "listen" to the call and act when requested upon. Specifically, embodiments of the present invention include a computerized personal assistant that is placed on the server side and receives voice-based data from all call participants, analyzes the voice-based data, and decides whether an actionable command was included in the data or not. Responses to determined commands are provided back as audio responses during the call.

For example, during a call between at least two participants, two of the participants decide to set up a meeting. The participants can ask the automated personal assistant to see where they both have free time on their respective calendars, and set up a meeting notice in each of the participants' respective calendars. Upon request, the system will access the calendar for each participant, whether remotely or locally managed, and check both participants' calendars and will read out some options for them to choose. After the transaction is completed both participants will have this meeting set up in their calendar.

Another example could include requesting a recording of the call to start, requesting to add another participant to the call, create a note or memo, play recordings of the participants' previous calls regarding a certain matter, and the like. These and other use case examples are described below in further detail.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any application that relies on or uses address books/contact directories may be used in embodiments consistent with the present invention without departing from the principles of the disclosure described herein. For example, access to the cloud address book may be provided via a browser of a user device. When a contact is modified in the cloud address book, the change is further reflected on the user device where the contact is a native contact, and further synchronized with the "owner" of the contact, such as GOOGLE, YAHOO!, or Exchange.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a PSTN/cellular network 130 via a gateway 122. The PSTN/cellular network 130 may also be directly coupled to the Internet 110 through one of its own internal gateways (not shown). Thus, communications may pass back and forth between the IP telephony system 120 and the PSTN/cellular network 130 through the Internet 110 via a gateway maintained within the PSTN/cellular network 130.

The gateway 122 allows users and devices that are connected to the PSTN/cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may be provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to PSTN/cellular network 130 may call a customer of the IP telephony system 120. In this instance, the call is initially connected from the analog telephone 132 to the PSTN/cellular network 130, and then from the PSTN/cellular network 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN/cellular network 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device such as an APPLE IPHONE or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a wireless local area network (WLAN) router based on the Institute of Electrical and Electronics Engineers' (IEEE) 802.11x or 802.16x standards. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities or establish a voice-based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as protocols based on (IEEE) 802.11x or 802.16x standards.

Similarly, mobile computing device with cellular capabilities 136B may also be coupled to internet 110 and/or cellular service provider 130. In some embodiments, mobile computing device 136B may be connected to internet 110 via a wireless local area network (WLAN) connection based on the Institute of Electrical and Electronics Engineers' (IEEE) 802.11x or 802.16x standards, and the like, and can also establish a VOIP telephone calls with the IP telephony system 120 similar to mobile computing device 136A. In embodiments of the present invention, communications environment 100 may be used to establish voice based or data-based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Figure 2:
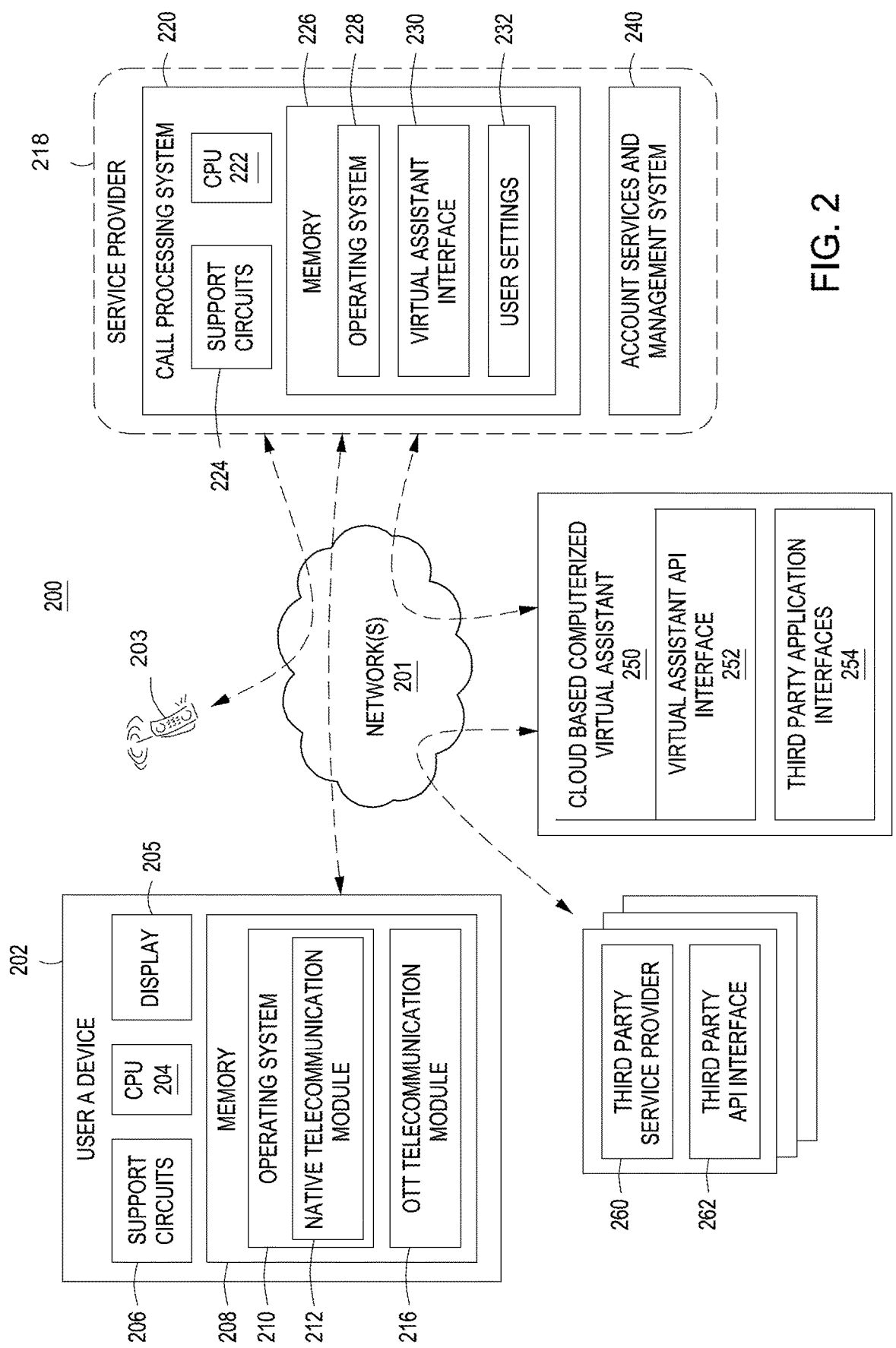
FIG. 2 is a detailed block diagram of a communication system for integrating and using automated personal assistance systems in voice telephony communications in accordance with one or more embodiments of the invention.

FIG. 2 depicts a block diagram of a system 200 for providing computerizing virtual assistant services, according to one or more embodiments. The system 200 comprises multiple user devices, such as user devices 202 and 203, and communications service provider 218 communicatively coupled via networks 201. In some embodiments, user devices 202 and 203 may be mobile computing devices (e.g., 136A, 136B, and the like) associated with a user, and communications service provider 218 may be a VoIP telephony IP telephony system 120 or a cellular service provider 130, as described above in FIG. 1.

The networks 201 comprise one or more communication systems that connect computers by wire, cable, fiber optic and/or wireless link facilitated by various types of well-known network elements, such as hubs, switches, routers, and the like. The networks 201 may include an Internet Protocol (IP) network 110, a public switched telephone network (PSTN) 130, or other mobile communication networks, and may employ various well-known protocols to communicate information amongst the network resources.

Each user device 202 and 203 may comprise a Central Processing Unit (CPU) 204, display 205, support circuits 206, and memory 208. The CPU 204 may comprise one or more commercially available microprocessors or microcontrollers that facilitate data processing and storage. The various support circuits 206 facilitate the operation of the CPU 204 and include one or more clock circuits, power supplies, cache, input/output device and circuits, and the like. The memory 208 comprises at least one of Read Only Memory (ROM), Random Access Memory (RAM), disk drive storage, optical storage, removable storage and/or the like. In some embodiments, the memory 208 comprises an operating system 210, telecommunications module 212 including a native dialer, and an over-the-top (OTT) telecommunication module 216, such as a VoIP mobile app or VoIP mobile extension telecommunication app.

The operating system (OS) 210 generally manages various computer resources (e.g., network resources, file processors, and/or the like). The operating system 210 is configured to execute operations on one or more hardware and/or software modules, such as Network Interface Cards (NICs), hard disks, virtualization layers, firewalls and/or the like. Examples of the operating system 210 may include, but are not limited to, various versions of LINUX, MAC OSX, BSD, UNIX, MICROSOFT WINDOWS, IOS, ANDROID and the like. In some embodiments, operating system 210 may include an application programming interface (API) which can be used to access and user device information and features (such as, for example, by telecommunication module 216).

The native telecommunication module 212 may be used to facilitate, and otherwise provide, communication services such as, for example, GSM voice calling, CDMA voice calling, or various other types of communication services provided by a PSTN/Cellular service provider 130 (e.g., using traditional mobile phone mobile communication technology standards).

In some embodiments, the telecommunication module 216 may be a mobile VoIP app that provides VoIP telephony services to an end-user. For example, in some embodiments, telecommunication module 216 may be a mobile extension application installed on each user device 202 and 203 that can associate (e.g., link/charge) outgoing and/or incoming calls made from user devices 202 and 203 to the same VoIP telephony account. In some embodiments, an end-user may download the telecommunication module 216 from communications service provider 218, or from an app distribution system 144, and install the telecommunication module 216 on their device.

In some embodiments, communications service provider 218 may be a VoIP or cellular service provider that includes a call processing system 220 for processing call requests. In other embodiments, call processing system 220 may be a separate entity that provides call processing services to communications service provider 218, or to individual users, by agreement. The call processing system 220 may include a Central Processing Unit (CPU) 222, support circuits 224, and memory 226. The CPU 222 may comprise one or more commercially available microprocessors or microcontrollers that facilitate data processing and storage. The various support circuits 224 facilitate the operation of the CPU 222 and include one or more clock circuits, power supplies, cache, input/output circuits, and the like. The memory 226 comprises at least one of Read Only Memory (ROM), Random Access Memory (RAM), disk drive storage, optical storage, removable storage and/or the like. In some embodiments, the memory 226 comprises an operating system 228, a virtual assistant interface 230, and user settings 232. The operating system (OS) 228 generally manages various computer resources (e.g., network resources, file processors, and/or the like). The operating system 228 is configured to execute operations on one or more hardware and/or software modules, such as Network Interface Cards (NICs), hard disks, virtualization layers, firewalls and/or the like. Examples of the operating system 228 may include, but are not limited to, various versions of LINUX, MAC OSX, BSD, UNIX, MICROSOFT WINDOWS, IOS, ANDROID and the like.

The communications service provider 218 includes an account services and management system 240. The account services and management system 240 maintains information about all subscribers, such as for example, identification information, account information, device information, associated communication identifiers (e.g., telephone numbers and/or other identifiers), and the like. In addition, the account services and management system 240 provides services such as calendars, address books, voicemail, call recording, and other types of telephony/productivity services to end users of the communications service provider 218. In some embodiments, the account services and management system 240 is be comprised of one or more services that each provide one or more account management and telephony/productivity services.

As noted above, the call processing system 220 processes call requests and establishes telecommunication sessions between users, such as for example, between user A device 202 and user B 203 device. In some embodiments, once a telecommunication session has been established the computerized virtual assistant (CVA) services may be initiated. In some embodiments, the CVA services may be initiated based on each the telecommunication session participants' user settings 232. For example, if the telecommunication participants enable the CVA services in their user profiles stored in user settings 232, then the cloud-based CVA services will be initiated for that telecommunication session for all participants. In some embodiments, the cloud-based CVA services will not be initiated during the telecommunication session if at least one participant has not enabled the CVA services in their user profile. In other embodiments, the cloud-based CVA services will be initiated only for the participants that have enabled such services in their user profile/settings in 232. Still, in other embodiments, the cloud-based CVA services may be initiated but inactive on every telecommunication session, and only activated upon request by one or more of the participants on the call. For example, activation may be based on, but not limited to, utterance of a specific keyword/trigger word by one of the participants, a DTMF (dual tone multi frequency) code entered through a telephone dial pad, or through a selectable object/button on an end user device (e.g., 202 or 203). In some embodiments, a message will be played to all participants on the call informing them that CVA services are either available or unavailable, and/or how to initiate and use the CVA services. For example, if CVA services are initiated and/or activated, the participants on the call may be notified via an audible message, an SMS message, a push notification, and the like. Each person in the session will be able to accept or decline the use of the CVA.

If CVA services are enabled/initiated for a telecommunication session, the virtual assistant interface 230 of call processing system 220 will establish communications with a cloud-based CVA 250 through network 201. In some embodiments, the virtual assistant interface 230 may pass some of the voice-based data from the telecommunication session between user A and user B to the cloud-based CVA 250 for processing. The voice-based data may be a collection of voice/audio data packets generated during the telecommunication session. In some embodiments, all voice-based data (i.e., all voice/audio data packets) from the telecommunication session are sent to the cloud-based CVA 250 for processing. In other embodiments, the use of a customizable trigger is used initiate the sending of the voice-based data, by the virtual assistant interface 230 of call processing system 220, to the cloud-based CVA 250 for processing. The trigger word could be a default word set by each of the commercialized CVA's, such as "ALEXA", "SIRI", "OK GOOGLE", and the like. In some embodiments, the trigger word could be set by the user or the call processing system to be any trigger word desired. In some embodiments, the virtual assistant interface 230 on call processing system 220 may perform some pre-processing on the audio data from the call to extract the commands/services requested by the participant(s), before sending the request to the cloud-based CVA 250.

As shown in FIG. 2, the cloud-based CVA 250 may be an external cloud-based service and not part of the communications service provider 218. The cloud-based CVA 250 includes a Central Processing Units (CPU), support circuits, and memory as described above with respect to the call processing system 220 and as shown and described in FIG. 5 below. In some embodiments, the cloud-based CVA 250 may be incorporated as part of the communications service provider 218, and specifically, part of call processing system 220.

In other embodiments, the virtual assistant interface 230 may establish a connection with the cloud-based CVA 250 as a participant in the telecommunication session between user A device 202 and user B device 203. In this case, the cloud-based CVA 250 would "listen" to the entire telecommunication session for a customizable trigger word, as described above, that would indicate that CVA services are about to be requested. In some embodiments, if the cloud-based CVA 250 is a participant in the telecommunication session, the cloud-based CVA 250 may provide its responses/feedback directly on the call for all participants to hear. In some embodiments where the cloud-based CVA 250 is a participant on the telecommunication session, the cloud-based CVA 250 would receive and accept telecommunication connection requests (e.g., using the SIP protocol).

The virtual assistant interface 230 is able to establish communications with, and access services from, cloud-based CVA 250 through an application programming interface (API). API calls are sent from virtual assistant interface 230 to the cloud-based CVA 250 and processed by the virtual assistant API interface 252 disposed on the cloud-based CVA 250. An exemplary virtual assistant API interface 252 may include, but is not limited to, AMAZON's ALEXA VOICE SERVICE (AVS) API. In some embodiments, the communications between the virtual assistant interface 230 on call processing system 220 and the virtual assistant API interface 252 on cloud-based CVA 250 may be HTTP/2 type connection communications or the like. The details and functionality of HTTP/2 can be found in the Internet Engineering Task Force (IETF) Request for Comments (RFC) Paper No. 7540 entitled, "Hypertext Transfer Protocol Version 2 (HTTP/2)," that is herein incorporated in its entirety by reference. It should be understood that HTTP/2 is an example of one communication protocol that may be used and that other communication protocols may be used as well.

Audio from the telecommunication session can be sent/streamed to the virtual assistant API interface 252 on cloud-based CVA 250. Feedback/responses from the cloud-based CVA 250 would be received by the virtual assistant interface 230 on call processing system 220 and played/streamed to the participants of the telecommunication session. In some embodiments, feedback/responses from the cloud-based CVA 250 may be sent as an audio packet/file, a text string, a video, an image, an SMS message, a PUSH notification, an email message, a separate telephone call, and the like. For example, if the virtual assistant interface 230 sent a request to cloud-based CVA 250 to schedule a meeting in the participants' calendars, the cloud-based CVA 250 will return an audio message, or a text string, to the virtual assistant interface 230 that will say what happened (e.g., "A meeting for Nov. 14, 2016 at 3:00 PM EST has been successfully added to your calendars"), and will be played to all participants of the call.

In some embodiments, the CVA services requested by one or more participants on the call may require access to specific account information, including those maintained by third-party service providers 260, associated with one or more of the telecommunication session participants. In order to be able to access specific account information for each of the participants (e.g., calendars, address books, tasks, notes, and the like), the virtual assistant interface 230 is configured to obtain and send specific account information for one or more of the telecommunication session participants in the API calls to the virtual assistant API interface 252 on cloud-based CVA 250. More specifically, the virtual assistant interface 230 may use information from the telecommunication session itself such as, for example, communication identifier of the participants, and any other information available from the telecommunication session. In addition, the virtual assistant interface 230 may access and obtain information from user settings, 232, account services and management system 240, and the like, to obtain the specific account information necessary to access various services associated with each participant. Any of the information obtained may be used as lookup information to obtain further information in order to access the accounts and services identified in the users requests to the CVA. In some embodiments, the virtual assistant interface 230 will ask the participants directly for account information (e.g., user name, passwords, email addresses, etc.) required to access the accounts/services associated with the participant's request. If the information is sensitive, such as bank account information or passwords, the information can be provided by the user to the virtual assistant interface 230 via SMS or other forms of private communication.

If one or more third-party service providers 260 are associated with a request to the cloud-based CVA 250, a third-party application interface 254 disposed on the cloud-based CVA 250 would establish communications with, and access services from, the third-party service providers 260 through an API. API calls are sent from virtual assistant interface the third-party application interface 254 on the cloud-based CVA 250 to the third-party API interface 262 provided by the one or more third-party service providers 260. The information required to access the accounts of the participants is provided by the third-party application interface 254, which received the information from the virtual assistant interface 230 on call processing system 220.

In some embodiments, the account services and management system 240 may be accessed by the third-party application interface 254 on the cloud-based CVA 250 to handle requests specific to services provided by the communications service provider 218 on behalf of participants. For example, the communications service provider 218 may provide address book or calendar services to its users. If a participant in a telecommunication session requests CVA services during the call to add a contact to their address book, the cloud-based CVA 250 will determine that this request is associated with an address book service that communications service provider 218 has added as an available service (e.g., a skill) on the cloud-based CVA 250 for its subscribers. The cloud-based CVA 250 will access the account services and management system 240 on communications service provider 218 using the information provided in the request. The cloud-based CVA 250 will then have the account services and management system 240 perform the desired action (e.g., add the contact to the address book), and retrieve a response from the account services and management system 240 to confirm what action, if any, was taken. The account services and management system 240 use the information included in the request to determine which participant is making the request and will attempt to add the contact. The request may be in the form of an API call that includes participant information in addition to the action requested. The response from the account services and management system 240 would be sent back to the CVA 250, and then to call processing system 220 to play back to the participants as described above. In some embodiments, the CVA 250 may make an API call to the virtual assistant interface 230 to access information/request service from the account services and management system 240.

Figure 3:
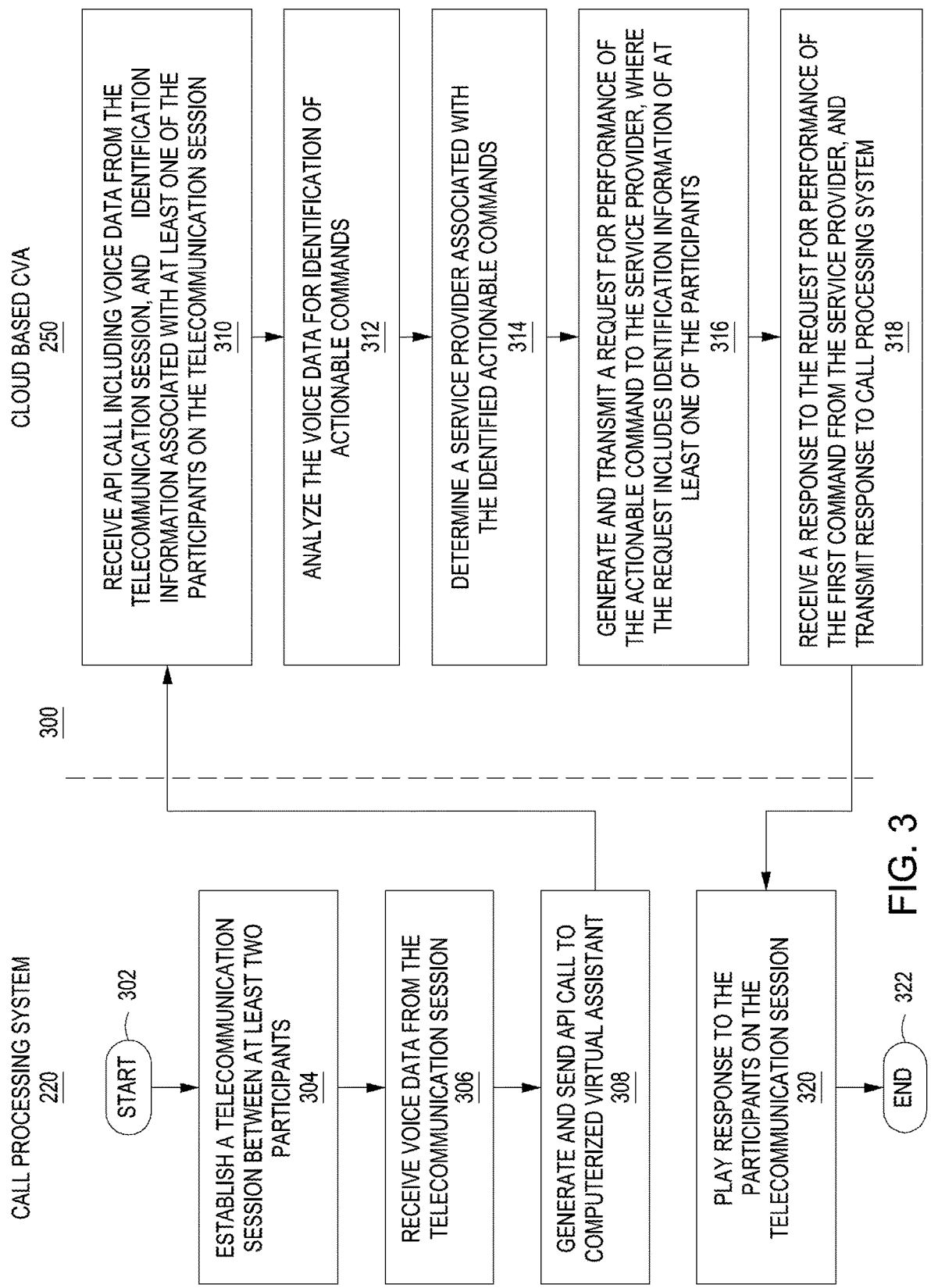
FIG. 3 is a flow diagram of an exemplary method for integrating and using automated personal assistance systems in voice telephony communications in accordance with one or more embodiments of the invention.

Exemplary methods that may be performed by one or more elements of system 200 for integrating and using automated personal assistance systems in voice telephony communications are described below with respect to FIG. 3. FIG. 3 is a flow diagram of an exemplary method 300 for integrating and using automated personal assistance systems in voice telephony communications. The method 300 starts at 302 and proceeds to 304. At 304, the call processing system 220 establishes a telecommunication session between at least two participants and their associated devices (e.g., user A device 202 and user B device 203). At 306, the call processing system 220 will monitor and/or receive voice data from the telecommunication session between user A and user B.

At 308, API calls will be generated and sent to the cloud-based CVA 250. More specifically, the API calls will be generated and sent by the virtual assistant interface 230 of the call processing system 220. In some embodiments, the API calls will include formatted packets of voice data from the telecommunication session, and identification information associated with at least one of the participants in the telecommunication session. The identification information about the participant may include, but is not limited to, user names, login IDs, passwords, email address(es), phone number(s), IP address(es), and the like. In addition, an identifier of the telecommunication session associated with the request may also be included in the API call. As discussed above, in some embodiments the virtual assistant interface 230 may format and pass all voice-based data from the telecommunication session in API calls to the cloud-based CVA 250 for processing. The voice-based data may be in the form of audio data packets. In other embodiments, the use of a customizable trigger word may be used to determine which voice-based data will be formatted and sent by the virtual assistant interface 230 of call processing system 220 to the cloud-based CVA 250 for processing. In some embodiments, the virtual assistant interface 230 on call processing system 220 may perform some pre-processing on the voice-based data from the call to extract the commands/services requested by the participant(s), before sending the request to the cloud-based CVA 250.

At 310, the cloud-based CVA 250 receives the API call which includes the voice-based data and the identification information associated with at least one of the participants. The API call is processed, and the voice-based data included in the call is analyzed for identification of actionable commands at 312. The actionable commands may include a set of default commands for obtaining various types of information or requesting certain services. In addition, various services/skills may be set up on the cloud-based CVA 250, such that each services/skill setup would include additional actionable commands that would be identified by the cloud-based CVA 250 as being associated with that services/skill.

At 314, a service provider associated with the actionable command is determined. In some embodiments, there may be multiple services/skills configured with the cloud-based CVA 250 that include similar/same actionable commands. Thus, in some embodiments, the cloud-based CVA 250 must determine a service provider based on the combination of the actionable command and information about the at least one of the participants (e.g., a participant identifier). In other embodiments, the actionable command may be unique and only associated with one service/skill.

At 316, a request for performance of the actionable command is generated and transmitted to the service provider. The request may be in the form of an API call to a third-party service provider 260 by third-party application interface 254 on the cloud-based CVA 250. The request/API call may include identification information of the at least one of the participants, in addition to the service/information being requested. In some embodiments, the request/API call may also include an identifier of the telecommunication session associated with the original request. In some embodiments, the account services and management system 240 may act as they third-party service provider 260, such that the cloud-based CVA 250 will request performance of the actionable command from the account services management system 240.

At 318, the cloud-based CVA 250 will receive a response to the request for performance the command from the third-party service provider 260. The response received will indicate whether the actionable command could be performed or may include the information requested. The response may be in the form of an audio packet/file, a text string, a video, an image, an SMS message, a PUSH notification, an email message, a separate telephone call, and the like. The response received would then be transmitted to the call processing system 220. Prior to transmission, the response may be formatted in the form of an API call or a response to an API call including an identifier of the telecommunication session associated with the original request.

At 320, the call processing system 220 receives the response from the cloud-based CVA 250 and plays or displays the response to the participants of the telecommunication session. In some embodiments consistent with the present invention, the entire method 300 is performed while the telecommunication session is in progress. The method ends at 322.

Figure 4:
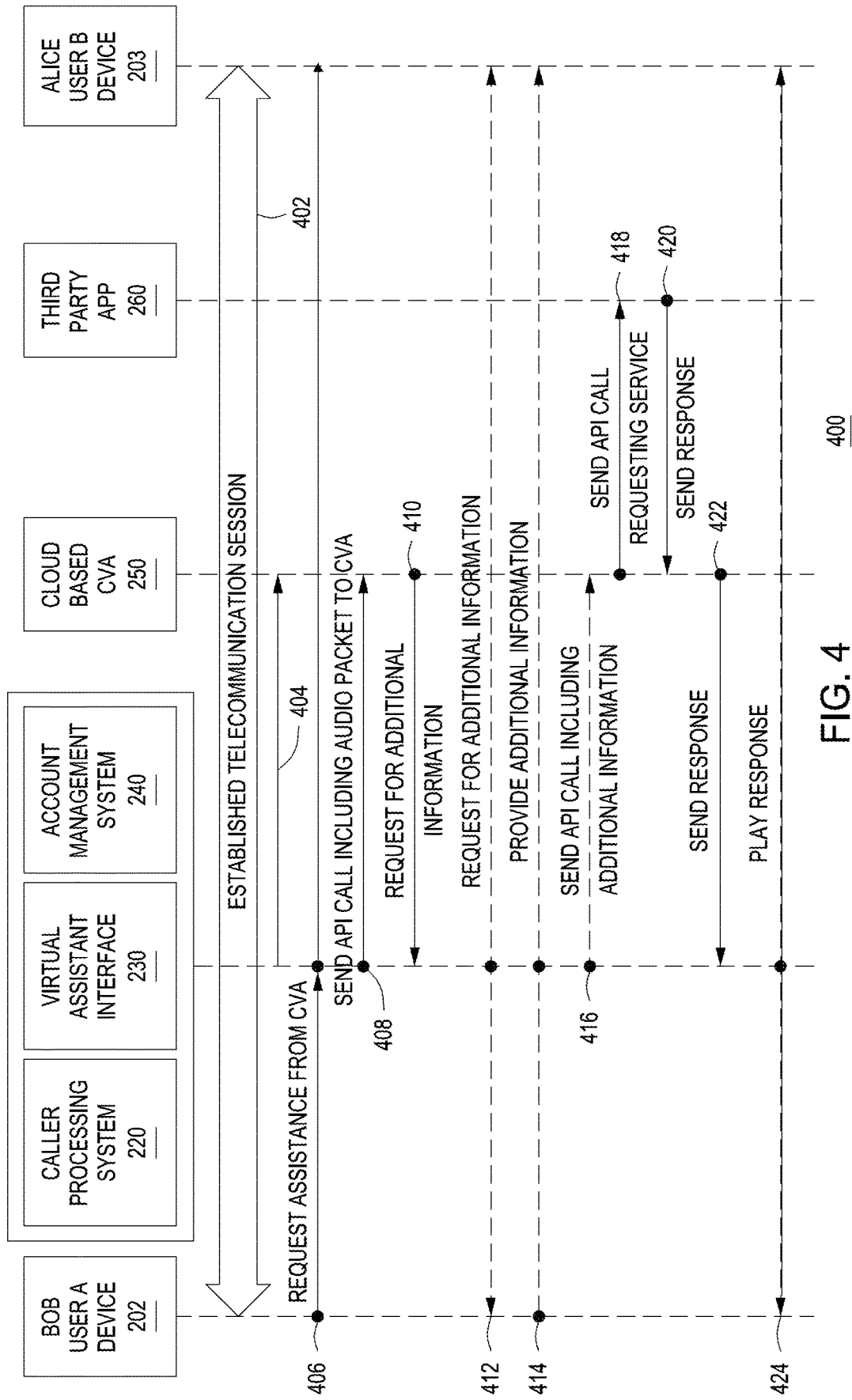
FIG. 4 is a block/system diagram depicting the interaction between system components for integrating and using automated personal assistance systems in voice telephony communications in accordance with one or more embodiments of the invention.

FIG. 4 is a block/system diagram depicting the interaction between system components for integrating and using automated personal assistance systems in voice telephony communications in accordance with one or more embodiments of the invention. FIG. 4 will be discussed in terms of an exemplary scheduling use case.

Bob and Alice are both employees at a business that uses a communications service provider 218 (e.g., uses a VoIP telephony service provider 120 as their phone provider). A telecommunication session 402, having a unique telecommunication session identifier, is established between Bob, associated with user A device 202, and Alice, associated with user B device 203, via communications service provider 218. Bob and Alice are talking on the phone deciding when they should get together for a meeting to discuss the "latest stock value rise for their company.".

As the conversation is progressing, the call processing system 220 is sending voice-based data from the telecommunication session to the cloud-based CVA 250 (404). These voice-based data may be sent in an API call which also may include participant identification information and/or the unique telecommunication session identifier.

During the call, Bob says to Alice: "Do you have some time to meet up tomorrow?". Alice answers back: "Hold on let me check." and then vocalizes the following request for assistance to the CVA at 406: "VA, can you find a time for me and Bob to meet tomorrow?", wherein "VA" has been preconfigured as a trigger word to request computerized virtual assistant services.

At 408, an API call is transmitted to cloud-based CVA 250 from the call processing system 220 as discussed above with respect to 308 of method 300 in FIG. 3. The API call is processed and analyzed by the cloud-based CVA 250 to determine if it includes an actionable command. If an actionable command is identified, the cloud-based CVA 250 will determine which service provider is associated with the actionable command. In the present use case, the actionable command is "find a time for Bob and me to meet", and it is determined that it is associated with a calendar service provider.

If multiple service providers (e.g., multiple different calendar services) are identified as being associated with a particular command, the cloud-based CVA 250 will determine which service provider is associated with each of the participants based on the participant information and command included in the API call. (i.e., "find a time for Bob and me to meet"). In some embodiments, if all the required information to access the service/service provider is not provided in the API call, the cloud-based CVA 250 may send a request for additional information back to the call processing system 220, as shown in 410. The call processing system will then request additional information from the participants at 412. For example, the additional information requested may include a timeframe to look for possible dates in which to meet. At 414, Bob provides the additional information for all participants to hear. At 416, the additional information is provided to cloud-based CVA 250 in the form of an API call, including the additional information. Once the cloud-based CVA 250 has the required information to format an API call to the calendar service, it will generate and send the API call to the third-party calendar service 260 at 418.

At 420, third-party calendar service provider 260 will send a response to the cloud-based CVA 250 including the available dates for Bob and Alice to meet. In some embodiments, if Alice and Bob have different calendar service providers, separate API calls will be sent by cloud-based CVA 250 to each service provider on behalf of each user. The responses received by the cloud-based CVA 250 will then be analyzed and aggregated to provide a final set of available dates for Bob and Alice to meet as requested.

At 422, the cloud-based CVA 250 will send the response to call processing 220. That response will be played to all participants of the telecommunication session at 424. Alice and Bob will hear all the options and Alice will say: "VA, schedule a meeting for me and Bob tomorrow at 9:30 a.m. to discuss the latest stock value rise." The same process beginning at 408 will then be performed to schedule the meeting.

In addition to the scheduling functionality described above, a non-exhaustive list is provided below of at least some services/tasks/skills that may advantageously be performed by the computerized voice assistant service in the context of an ongoing telecommunication session consistent with embodiments of the present invention:

a) request to add a new caller to the call;
b) request for audio/video clips to be played to all participants on the call;
c) request to play a song on the call;
d) request display of images (e.g., from a recent trip) from a local or online image storage service;
e) request for calculator services while one the call;
f) request to display a map/driving-directions/etc. and other trip related information during the call (e.g., trip distance/time or add a destination to a mapping application);
g) request to make a note of what was just said;
h) request to start and stop a recording of a call;
i) request to add a person to a contact list or edit a person's contact information;
j) if two people are close by and are trying to meet (i.e., when in a crowded area) the CVA can tell each participant where to go in order to meet; and
k) provide product and price information to a customer and a sales associate during a call.

In the use cases regarding adding or editing a person's contact information, in some embodiments, CVA services may be requested by pressing a button and asking it to start capturing contact information. One of the participants on the call would begin dictating a telephone number and/or additional information, such as email, name, notes about the contact, etc. The system could automatically recognize that a telephone number is being provided by the format of the number dictated, and similarly recognize that an email is being provided by the format of the email address dictated. For example, the system may recognize the "at" and "dot com" between words spoken as indicating an email address as being provided. In some embodiments, the system would dictate back the contact information to the participants on the call to verify the correctness of contact information. In some embodiments, a label for the information being provided may be spoken first to assist the CVA 250 in determining what information is being provided. For example, after activating CVA services through a trigger word or button, for example, if a participant said "Add Contact" followed by "Contact Name John Doe", "Contact Email johndoe@company.com", "Contact Phone number 5553322", the system would recognize the "Contact Name" label as describing the information that is about to follow.

In the use cases regarding a request to display a map/ driving-directions/etc. and other trip related information, in some embodiments the CVA 250 may generate and send a mapping application API call with the address information provided by one of the participants during the call. The API call to the mapping application would cause the mapping application to open with navigation instructions to the address provided. In some embodiments, the mapping application would open while the call is in progress. In other embodiments, the mapping application would open after the call has ended based on the user's request or based on a configuration option set in the user's profile.

In some embodiments consistent with the present invention, the CVA services may include on demand dictation, recording, or transcription services during a telecommunication session. In some embodiments, when such services are activated, all parties are notified to comply with legal requirements. In some embodiments, one or more of the participants may have a smart watch that can receive transcribed text from the call in real time (i.e., during the call). In some embodiments, the transcribed text may be transmitted to the smart watch and the participant's device simultaneously. Thus, as the audio call progresses, the smart watch will show, in real time, what text has been captured and mistakes can be amended on the fly. For example, in some embodiments a user may tap on a specific words/phrases on the smart watch and get additional options (e.g., spelling suggestions, actions to take, etc.) based on what the transcription algorithm has captured for possible corrections.

In some embodiments consistent with the present invention, private mode functionality can be used by a participant of the telecommunication session. For example, a request from a participant operating in private mode would not be heard by the other participants, and responses to those requests would also not be heard by the other participants. For example, this can be useful for a sales person who wants to find ways of getting knowledge of certain aspects of a product without having the customer know he is using the internet while doing so, or if someone wants to get personal information during a call without letting the other participants hear everything that the personal assistant is reading out (e.g., a certain day's calendar schedule, an email that consists of something relevant to the call, etc.), or if a specific request requires authentication such as, for example, getting some information from a bank account or a password. Private mode functionality could be invoked using a button that will trigger a request to the personal assistant and not send the audio to the participants. In some embodiments, private mode functionality could be invoked using a DTMF signal. In some embodiments, in private mode responses may be delivered via SMS message, or something similar, to the participant who initiated the private mode request.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
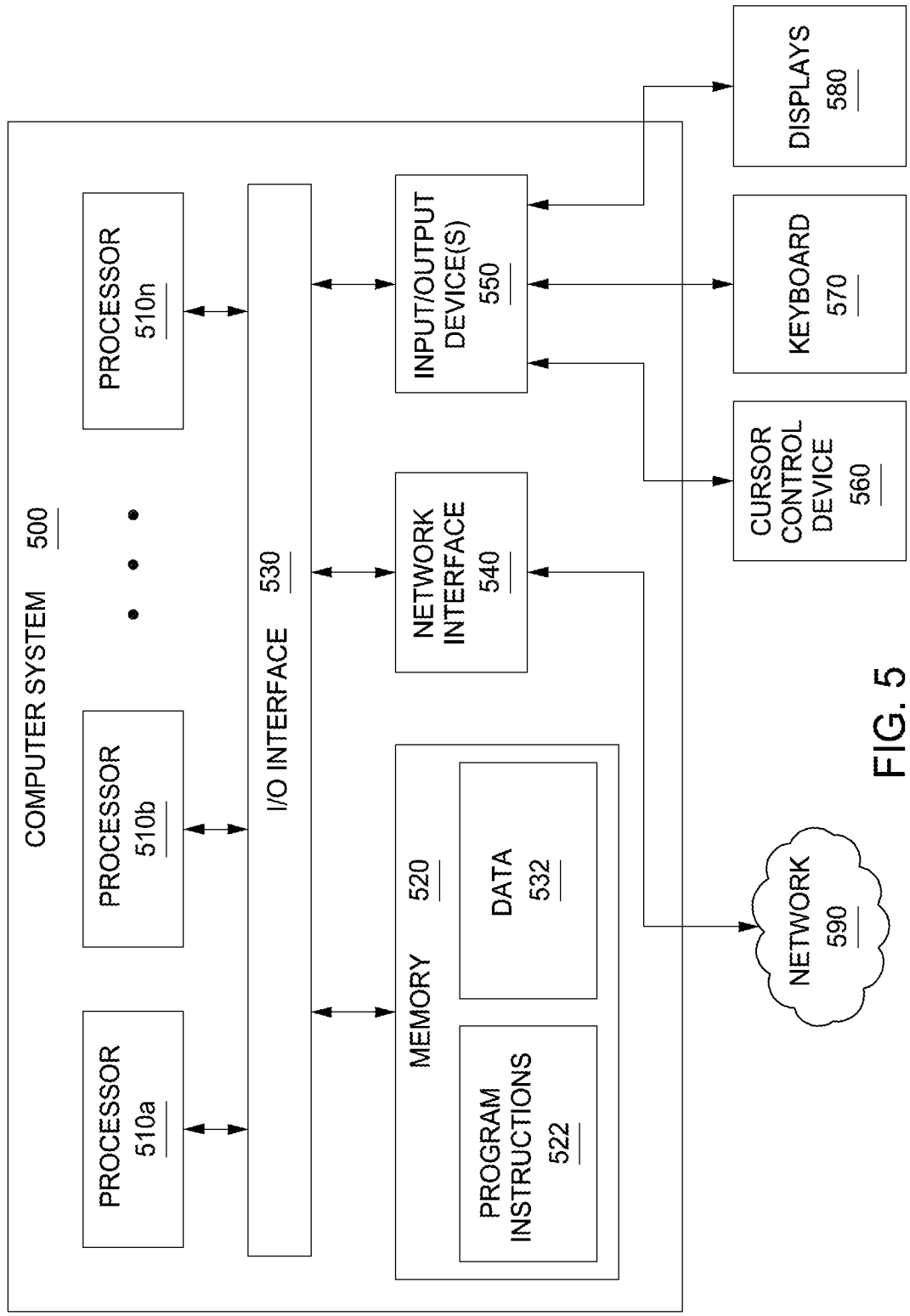
FIG. 5 is a depiction of a computer system that can be utilized in various embodiments of the present invention.

FIG. 5 depicts a computer system 500 that can be utilized in various embodiments of the present invention to implement the computer and/or the display, according to one or more embodiments.

Various embodiments of method and apparatus for providing and using integrated automated/computerized personal assistance systems in voice telephony systems and communications, as described herein, may be executed on one or more computer systems, which may interact with various other devices. One such computer system is computer system 500 illustrated by FIG. 5, which may in various embodiments implement any of the elements or functionality illustrated in FIGS. 1-6. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 300 and 400 as processor-executable executable program instructions 522 (e.g., program instructions executable by processor(s) 510) in various embodiments.

In the illustrated embodiment, computer system 500 includes one or more processors 510*a*-510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIGS. 3A-6. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for providing computerized virtual assistance services during a telecommunication session between a first user device associated with a first participant and a second user device associated with a second participant, comprising:
    transmitting, by a call processing system, (A) voice-based data generated during the telecommunication session and (B) identification information of at least one of the first or second participants to a computerized virtual assistant system, wherein the voice-based data generated during the telecommunication session includes an actionable command, as a first Application Programming Interface (API) call; and
    receiving, from the computerized virtual assistant system, a response from at least one service provider regarding a performance of the actionable command.

2. The computer-implemented method of claim 1, receiving from the computerized virtual assistant system a notification based on the response received from the at least one service provider.

3. The computer-implemented method of claim 2, wherein the notification is received while the telecommunications session is ongoing.

4. The computer-implemented method of claim 2, further comprising audibly playing the notification, or information associated with the notification, during the telecommunication session to the first and second participants.

5. The computer-implemented method of claim 1, wherein the at least one service provider causes information associated with an account of one of the first or second participants held by the at least one service provider to be updated in response to the performance of the actionable command.

6. The computer-implemented method of claim 5, wherein the at least one service provider is a calendar utility service provider.

7. The computer-implemented method of claim 6, wherein the actionable command is a request to provide information about existing calendar events or open calendar slots associated with at least one of the first and second participants.

8. The computer-implemented method of claim 7, wherein the request for performance of the actionable command is a request to schedule a meeting between the first and second participants.

9. The computer-implemented method of claim 1, wherein the API call further includes a unique identifier of the telecommunication session.

10. A non-transitory computer readable medium for storing computer instructions that, when executed by at least one processor causes the at least one processor to perform a method for providing computerized virtual assistance services during a telecommunication session between a first user device associated with a first participant and a second user device associated with a second participant, comprising:
    transmitting, by a call processing system, (A) voice-based data generated during the telecommunication session and (B) identification information of at least one of the first or second participants to a computerized virtual assistant system, wherein the voice-based data generated during the telecommunication session includes an actionable command, as a first Application Programming Interface (API) call; and
    receiving, from the computerized virtual assistant system, a response from at least one service provider regarding a performance of the actionable command.

11. The non-transitory computer readable medium of claim 10, further comprising receiving from the computerized virtual assistant system a notification based on the response received from the at least one service provider.

12. The non-transitory computer readable medium of claim 11, wherein the notification is received while the telecommunications session is ongoing.

13. The non-transitory computer readable medium of claim 11, further comprising audibly playing the notification, or information associated with the notification, during the telecommunication session to the first and second participants.

14. The non-transitory computer readable medium of claim 10, wherein the at least one service provider causes information associated with an account of one of the first or second participants held by the at least one service provider to be updated in response to the performance of the actionable command.

15. The non-transitory computer readable medium of claim 14, wherein the at least one service provider is a calendar utility service provider.

16. The non-transitory computer readable medium of claim 15, wherein the actionable command is a request to provide information about existing calendar events or open calendar slots associated with at least one of the first and second participants.

17. The non-transitory computer readable medium of claim 16, wherein the request for performance of the actionable command is a request to schedule a meeting between the first and second participants.

18. The non-transitory computer readable medium of claim 10, wherein the API call further includes a unique identifier of the telecommunication session.

\* \* \* \* \*